United States Patent [19]
Sandman et al.

[11] Patent Number: 6,005,058
[45] Date of Patent: Dec. 21, 1999

[54] POLYDIACETYLENES EXHIBITING EXTENDED WAVELENGTH ABSORPTION MAXIMA

[75] Inventors: Daniel J. Sandman, Acton; James L. Foley, Boxborough, both of Mass.

[73] Assignee: University of Massachusetts Lowell, Lowell, Mass.

[21] Appl. No.: 08/968,782

[22] Filed: Nov. 12, 1997

[51] Int. Cl.$^6$ .................................................. C08G 69/48
[52] U.S. Cl. .......................... 525/422; 526/7; 525/910; 525/912
[58] Field of Search .................. 526/72; 525/910, 525/912, 422

[56] References Cited

U.S. PATENT DOCUMENTS

| | | | |
|---|---|---|---|
| 4,125,534 | 11/1978 | Yee ........................................ | 260/315 |
| 4,208,501 | 6/1980 | Yee et al. ............................... | 526/259 |

OTHER PUBLICATIONS

Yesinowski, J.P., et al., "Solid–State Reaction of Poly(1, 6–di–N–carbazolyl–2,4–hexadiyne) with Electrophiles—A $^{13}$C Cross–Polarization/Magic Angle Spinning NMR Study." In *Chrystallographically Ordered Polymers*, Daniel J. Sandman, Editor (DC: American Chemical Society), pp. 230–252 (1987).

Hood, R.J., et al., "Optical Properties of a Polydiacetylene Crystal: Poly–[1,6–Di (N–Carbazolyl)–2,4–Hexadiyne]," *Chemical Physics Letters*, 54(2):295–299 (1978).

Eckert, H., et al., "Solid–State Bromination of Poly(1, 6–di–N–carbazolyl–2,4–hexadiyne): A $^{13}$C CP–Mas NMR Study," *J. Am. Chem. Soc.*, 109(3):761–768 (1987).

Sandman, D.J., et al., "Structure and Solid–State Polymerization of 1,6–BIS(3',6'–dibromo–N–carbazolyl)–2,4–hexadiyne," *Macromolecules*, 28(24):8142–8146 (1995).

Sandman, D.J., "Conjugated Polymers (Insulating and Conducting Forms)." In *Polymeric Materials Encyclopedia*, vol. 2, J.C. Salamone, ed. (FL:CRC Press), pp. 1468–1480 (1996).

Nalwa, H.S., "Organic Materials for Third–Order Nonlinear Optics," *Advanced Materials*, 5:341–358 (1993).

Morrow, M.E., et al., "Single–Crystal Reflection and Raman Spectra of the Polydiacetylene THD," *Chemical Physics Letters*, 140:263–269 (1987).

Schott, M. and Wegner, G., "Properties of Polydiacetylenes." In *Nonlinear Optical Properties of Organic Molecules and Crystals*, vol. 2, D.S. Chemla and J. Zyss, eds. (Academic Press), pp. 20–49 (1987).

McKusick, B.C. and Melby, L.R., "p–Tricyanovinyl–N, N–Dimethylaniline (Ethenetricarbonitrile, p–dimethylaminophenyl–)." In *Organic Synthesis*, vol. IV, N. Rabjohn, ed. (NY:Wiley), pp. 953–954.

Excerpt from Schleier, G., Ph.D. Thesis, Universität Freiburg (1980).

English translation of exerpt from Schleier, G., Ph.D. Thesis, Universität Freiburg (1980).

(List continued on next page.)

*Primary Examiner*—Johann Richter
*Assistant Examiner*—Ebenezer Sacket
*Attorney, Agent, or Firm*—Hamilton, Brook, Smith & Reynolds, P.C.

[57] ABSTRACT

Polydiacetylenes prepared from 2,4-hexadiyne monomers substituted with at least one side chain component, exhibit an absorption maximum wavelength maximum greater than that exhibited by polydiacetylenes formed from 1,6-di-N-carbazolyl 2,4-hexadiyne. Preferably, the polydiacetylenes exhibit an absorption maximum that is in the range of visible light. Examples of suitable side chain components of the polydiacetylenes include cyanovinyl aromatic substituents and quinoid substituents. The polydiacetylenes exhibit useful third order nonlinear optical behavior for electromagnetic radiation in the visible and near-infrared electromagnetic wavelength range and can be formed by thermally-based synthesis methods.

30 Claims, 6 Drawing Sheets

OTHER PUBLICATIONS

Foley, J.L., et al., "New Polydiacetylenes with Visible Chromophoric Side Groups," from *Material Research Society Abstracts,* 1996, D14.7.

Okada, S., et al., "Synthesis and Third–Order Non–Linear Optical Properties of a Polydiacetylene from an Octotetrayne Derivative with Urethane Groups," *Nonlinear Optics,* 8:121–132 (1994).

Matsuda, H., et al., "Synthesis and Nonlinear Optical Properties of a New Polydiacetylene Derivative Having Sulfur Atom Directly Bound to the Main Chain," *Synthetic Metals,* 84:909–910 (1997).

Mulazzi, E., et al., "Photoinduced Infrared Bands in Short Polyacetylene Segments," from *International Conference on Science and Technology of Synthetic Metals Abstracts,* 1996, P2.210.

Takeda, H., et al., "Electronic Structures of the Polydiacetylene Derivatives Bearing Sulfur Atoms Directly Bound to the Polymer Main Chains," *Mol. Cryst. Liq. Cryst.,* 294:295–298 (1997).

POLYDIACETYLENES EXHIBITING EXTENDED WAVELENGTH ABSORPTION MAXIMA

BACKGROUND OF THE INVENTION

Nonlinear optical properties of certain materials can be employed to double or triple the frequency of electromagnetic radiation. For example, it has long been known that the frequency of lasers can be doubled by directing the beam through a quartz crystal. Several other inorganic materials, such as potassium dihydrogen phosphate, lithium niobate, cadmium sulfide, cadmium selenide, cadmium telluride, and cadmium germanium arsenide also have been the subject of nonlinear optical (NLO) research.

Recently, there has been considerable interest in development of organic and polymeric materials that can exhibit second and third order NLO phenomena. It is now known, for example, that second order nonlinear optical effects are exhibited only by materials that are noncentrosymmetric. Such organic and polymeric materials generally also require incorporation of suitable chromophores, such as azo dyes. Consequently, the variety of organic materials believed to be capable of second order NLO phenomena has been limited.

Third order NLO behavior, on the other hand, does not have the same symmetry requirements as that required to generate second order NLO effects. Among the most widely studied classes of polymers in the field of third order nonlinear optics is that of polydiacetylenes. A primary reason for studying third order nonlinear optical behavior of polydiacetylenes is that they are rigorously defined in terms of composition and chain sequence, and can often be synthesized in the form of macroscopic single crystals.

Possible applications for materials that exhibit third order nonlinear optical behavior include switching, amplification and multiplexing. In particular, third order nonlinear optical technology has been considered for many uses, such as incorporation into optical limiters to protect sensors and/or employment in advanced holographic techniques. Other potential applications include use as thermochromic sensors, photoreceptors, materials for optical storage, photoconductors for laser printers, and as photochemotherapeutic agents, among others. However, the absorption maxima exhibited by known polydiacetylenes has limited their utility.

One attempt to increase the wavelength at which crystallized polydiacetylenes exhibit absorption maxima is to incorporate sulfur-containing side chain substituents, such as alkylthio or arylthio groups. It is believed that the longer wavelength at which excitonic absorption maxima is observed is a consequence of stronger electron donation by alkylthio groups to the polymer chain of the polydiacetylene. However, such polymers generally must be formed by solid-state polymerization techniques that include ultraviolet or gamma ray irradiation. These techniques typically are difficult and expensive to conduct.

Therefore, a need exists for polydiacetylenes that exhibit absorption maxima at wavelengths greater than known polydiacetylenes, e.g., in the visible range, that overcome or minimize the above-mentioned problems.

SUMMARY OF THE INVENTION

The current invention is directed to polydiacetylene derivatives of 2,4-hexadiyne that exhibit extended wavelength absorption maxima.

In one embodiment, such a polydiacetylene is substituted with at least one side chain chromophoric component such that the resultant polydiacetylene exhibits an absorption maximum at a wavelength greater than that of a polydiacetylene formed from 1,6-di-N-carbazolyl-2,4-hexadiyne.

In a preferred embodiment, the polydiacetylene includes a side chain that is a cyanovinyl aromatic substituent, such as a dicyano- or tricyanovinyl aromatic substituent.

In another preferred embodiment, the polydiacetylene includes a side chain component that is a quinoid substituent, such as a cyanoquinodimethane.

Still another embodiment includes 2,4-hexadiynes suitable for forming the polydiacetylenes of the invention.

The present invention includes many advantages. For example, the polydiacetylenes of the invention often can be formed by thermally-based synthesis methods and, therefore, typically do not require use of sophisticated techniques. Further, reactants generally required to form the polydiacetylenes are readily available and inexpensive. In addition, absorption maxima exhibited by polydiacetylenes of the invention can reach into the near-infrared spectral region. Therefore, the variety of applications to which polymers exhibiting third order nonlinear optical behavior can be put in many instances is broader than that of conventional materials.

DESCRIPTION OF PREFERRED EMBODIMENTS

The features and other details of the apparatus and method of the invention will now be more particularly described with reference to the accompanying drawings and pointed out in the claims. It will be understood that the particular embodiments of the invention are shown by way of illustration and not as limitations of the invention. The principal features of this invention can be employed in various embodiments without departing from the scope of the invention. All parts and percentages are by weight unless otherwise specified.

The polydiacetylenes of the invention exhibit absorption maxima in the visible and near-infrared light range of electromagnetic radiation. In one embodiment, a polydiacetylene of the invention is substituted with at least one side chain component and exhibits a third order nonlinear or excitonic absorption maximum greater than that of a polydiacetylene with an unsubstituted carbazole side chain. In another embodiment, the polydiacetylene includes a side chain component and exhibits a third order nonlinear excitonic absorption maximum that is in the range of visible light. As defined herein, visible light means electromagnetic radiation that has a wavelength in a range of between about 400 and about 700 nanometers.

In one, preferred embodiment, the side chain component is a cyanovinyl aromatic substituent, such as a cyanovinyl aromatic substituent that includes at least two cyanogen groups. In a particularly preferred embodiment, a model compound for the cyanovinyl aromatic substituent exhibits a dipole moment of between about four and about twelve Debye.

Examples of suitable cyanovinyl aromatic substituents include substituted aromatic amine, carbazole, phenoxy, indole, and phenyl hydrazone side groups. Examples of specific cyanovinyl aromatic substituents include p-oxybenzylidinemalononitrile, N-alkyl-N-[p-dicyanovinylphenyl]amino, 4-tricyanovinyl xylenol, 3-tricyanovinyl indole, 3-tricyanovinylcarbazole, 4-tricyanovinyl-phenyl hydrazone, N-alkyl-N-[p-tricyanovinylphenyl] amino, etc.

An example of a polydiacetylene of the invention is formed by polymerizing 1,6-bis(N-methyl-N-[p-tricyanovinylphenyl] amino)-2,4-hexadiyne. Another example of a polydiacetylene of the invention is formed by polymerizing 1,6-bis(p-oxybenzylidenemalononitrile)-2,4-hexadiyne.

Figure 1:
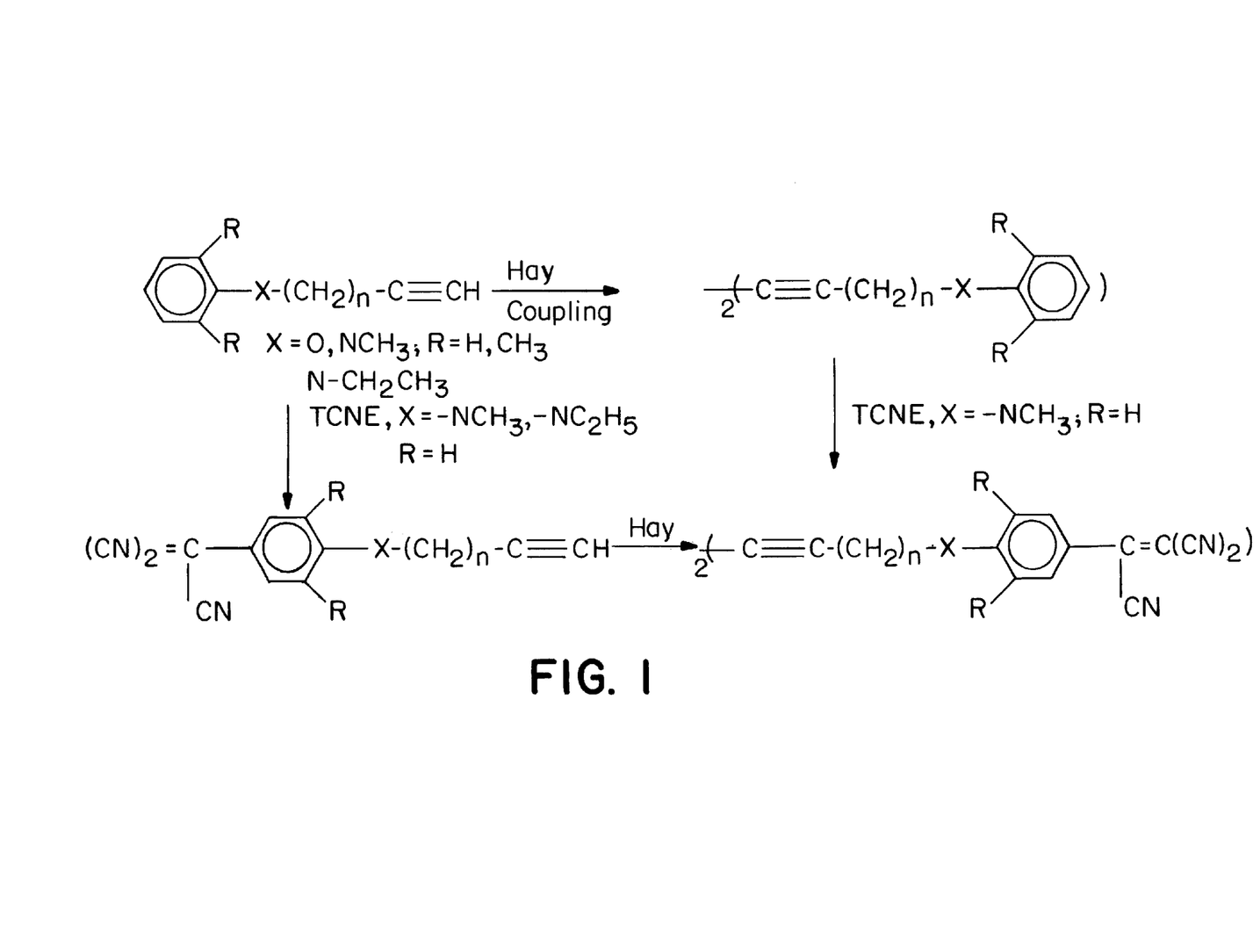
FIG. 1 is a schematic representation of a synthetic route to tricyanovinyl aromatic compounds suitable for forming polydiacetylenes of the invention.

A general synthetic approach to tricyanovinyl materials is outlined in FIG. 1. Alkylation of phenoxide or amine nucleophiles with monoacetylene or diacetylene halides or tosylates will form the desired intermediates. Monoacetylenes are converted to diacetylene monomers by Hay coupling (A. S. Hay, J. Org. Chem., 27:3320 (1962)), the teachings of which are incorporated herein in their entirety. Procedures for Hay coupling of several substrates, and tosylates as leaving groups with weak nucleophiles or sterically-hindered substrates, are described in M. E. Morrow, et al., Chem. Phys. Lett., 140:263 (1987); D. J. Sandman and Y. J. Chen, Polymer, 30:1027 (1989); V. E. Shklover, et al., J. Organometal. Chem., 378:235 (1989); and H. Eckert, et al., J. Am. Chem. Soc., 109:761 (1987), the teachings all of which are incorporated herein in their entirety. Tricyanovinyl groups may be introduced directly or via dicyanovinyl groups by suitable methods, such as are described by B. C. McKusick, et al., J. Am. Chem. Soc., 80:2806 (1958); G. N. Sausen, et al., J. Am. Chem. Soc., 80:2815 (1958); and J. R. Roland and B. C. McKusick, J. Am. Chem. Soc., 83:1652 (1961), B. C. McKusick, et al., Organic Syntheses, N. Rabjohn ed. (NY: Wiley) Collective Vol. IV, p. 953, the teachings of which are incorporated herein in their entirety. Dicyanovinyl groups can be synthesized by addition of malononitrile to aromatic aldehydes. The synthesis of N-methyl, N-propargylaniline (Reppe & Mitarbeiter, Ann. der Chemie, 596:38–75 (1955)), and the corresponding diacetylene monomer, as shown in FIG. 1, in particular, is described in G. Schleier, Ph.D. Thesis, Universitat Freiburg, 1980. The teachings of both Reppe & Mitarbeiter and Schleier are incorporated herein in their entirety.

Figure 2:
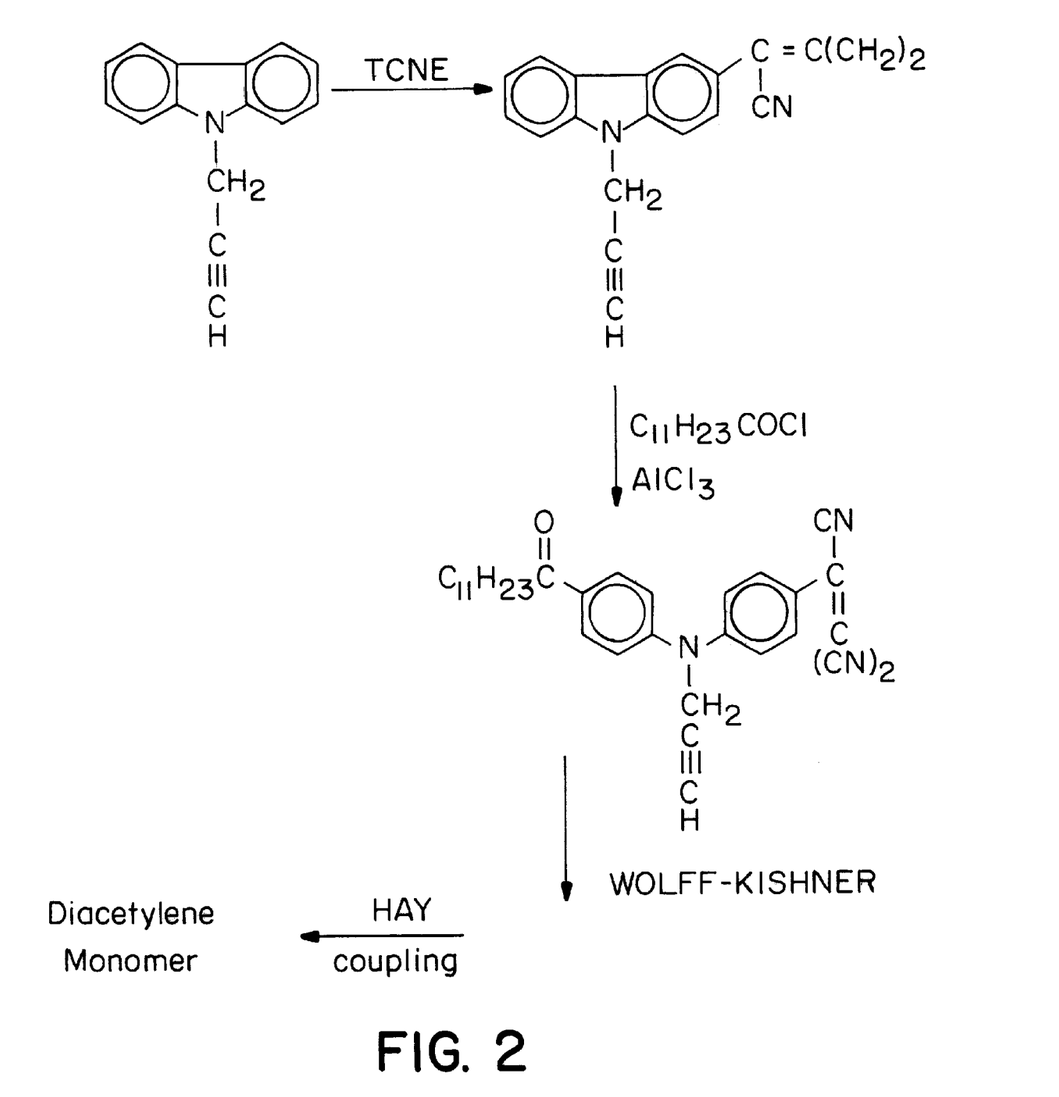
FIG. 2 is a schematic representation of a synthetic route to bis(3-n-dodecyl, 6-tricyanovinyl carbazole) derivative of 2,4-hexadiyne that is suitable for forming a polydiacetylene of the invention.
Figure 3:
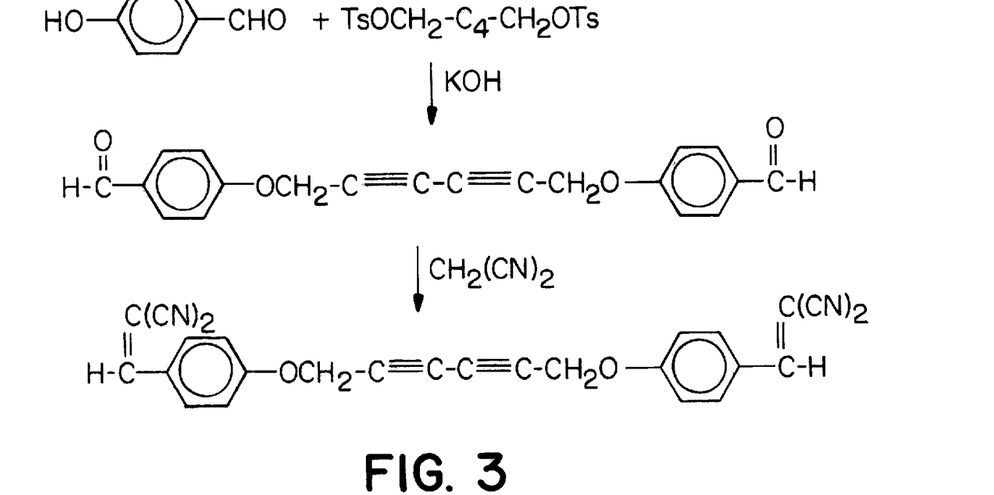
FIG. 3 is a schematic representation of a synthetic route to bis-1,6(p-oxo-benzylidenemalononitrile)-2,4-hexadiyne that is suitable for forming a polydiacetylene of the invention.

A specific example of a synthetic route to form a diacetylene monomer that can be polymerized to form a polydiacetylene of the invention is shown in FIG. 2. Therein, a synthetic route to form a bis(3-n-dodeco,6 tricyanovinyl carbazole) derivative of 2,4 hexadiyne, is shown. Another synthetic route to formation of a diacetylene monomer that can be employed to form polydiacetylenes of the invention is shown in FIG. 3. Therein, a synthetic route to bis-1,6(p-oxybenzylidinemalononitrile) 2,4-hexadiyne is shown. OTs and TsO represent p-toluenesulfonate.

Figure 4A:
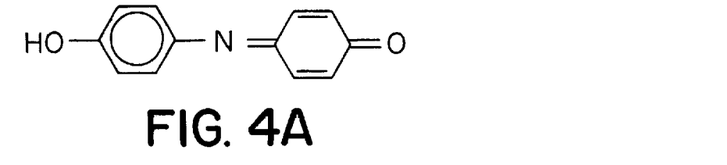
FIG. 4 shows structural formulas for (a) indophenol, (b) indoaniline and (c) quinodimethanes suitable for forming polydiacetylenes of the invention, where $R_1$ and $R_2$ are alkyl groups, one of which is propargyl.
Figure 4B:
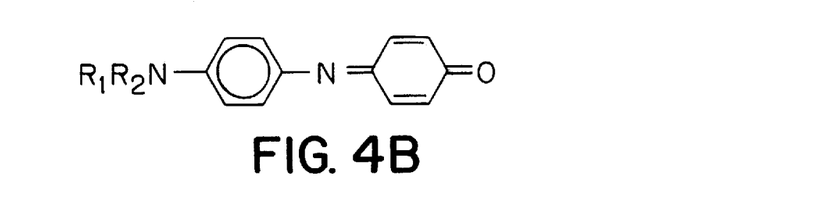
Figure 4C:
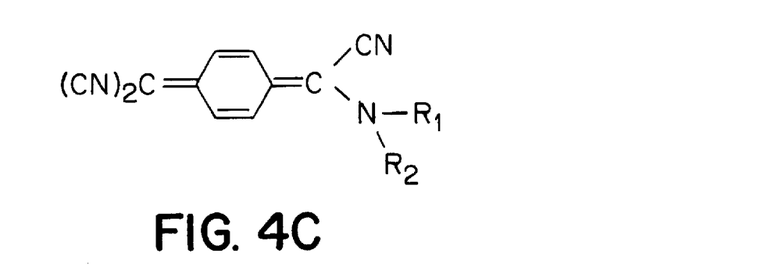

Alternatively, polydiacetylenes of the invention include a side chain component that is a quinoid substituent, such as a derivative of a cyanoquinodimethane. Other examples of quinoid substituents include indophenol, indoaniline and quinodimethanes, as shown in FIG. 4. An example of a specific quinoid substituent is 7-pyrrolidino, 7,8,8 tricyanoquinodimethane.

Figure 5:
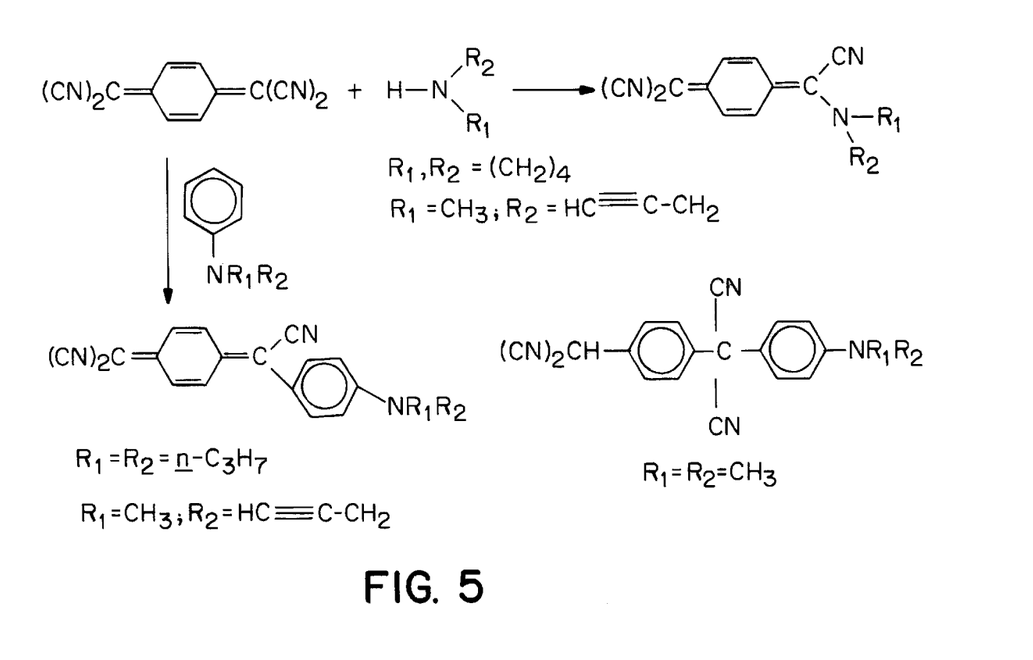
FIG. 5 is a schematic representation of a synthetic route to formation of tricyanoquinodimethane, with secondary aliphatic amines and aromatic tertiary amines, that are suitable for forming polydiacetylenes of the invention.
Figure 6:
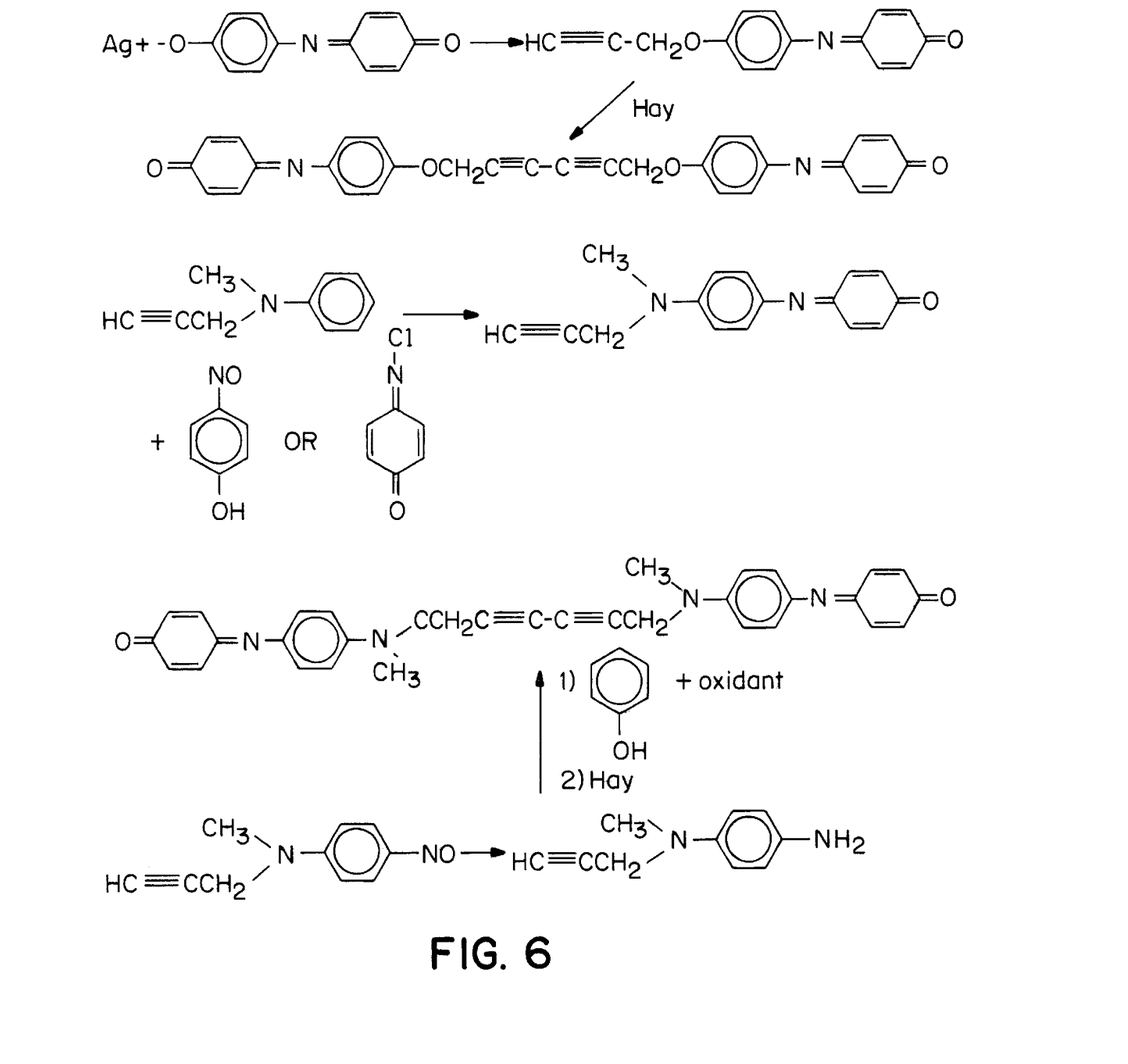
FIG. 6 is a schematic representation of synthetic routes to formation of indophenol and indoaniline-substituted diacetylenes that are suitable for forming polydiacetylenes of the invention.

Methods for forming some specific quinoid substituents and quinoid-substituted diacetylenes that can be polymerized to form the polydiacetylenes of the invention are shown in FIGS. 5 and 6. For example, secondary amines, such as pyrrolidine, react with 7,7,8,8-tetracyanoquinodimethane (TCNQ) to replace a cyano group, as described in W. R. Hertler, et al., J. Am. Chem. Soc., 84:3387 (1962), the teachings of which are incorporated herein in their entirety. This substitution brings about a substantial bathochromic shift ongoing from TCNQ($\lambda_{max}$395 nm) to the pyrrolidino-substituted compound ($\lambda_{max}$567 nm).

Another type of tricyano compound is also readily available from TCNQ. N-N-di-n-propylaniline interacts with TCNQ to give a crystallographically-defined tricyanoquinodimethane shown in FIG. 5, and is further described in Z. P. Povet'eva, et al., Zh. Strukt. Khim., 22:94 (1981), the teachings of which are incorporated herein in their entirety. FIG. 5 illustrates reactions of TCNQ with secondary aliphatic amines and N,N-dialkylanilines. These reactions are further described in D. S. Acker and W. R. Hertler, J. Am. Chem. Soc., 84:3370 (1962), J. Figureras, J. Am. Chem. Soc., 93:3255 (1971), and P. W. Vittum and G. H. Brown, J. Am. Chem. Soc., 68:2235 (1946), the teachings of all of which are incorporated herein in their entirety. Reactions with methyl, propargyl amine and N-alkyl, N-propargylaniline, are suitable, as well as reactions with compounds having additional $CH_2$ groups between the nitrogen and the alkyne. These monoacetylenes may be converted to diacetylene monomers by Hay coupling.

There is an extensive literature associated with the synthetic chemistry of indophenols and indoanilines. FIG. 6 respectively illustrates some representative approaches to bis-1,6-hexadiyne derivatives of these compounds by appropriate modification of literature procedures, described in J. Figueras, J. Am. Chem. Soc., 93:3255 (1971); P. W. Vittum and G. H. Brown, J. Am. Chem., Soc., 68:2235 (1946); F. Kehrmann and C. Decker, Chem. Berichte, 54:2439 (1921); S. E. Krahler, et al. in The Chemistry of Synthetic Dyes and Pigments, H. A. Lubs ed. (NY: Reinhold Publishers), pp. 263–266 and pp. 321–323 (1955); and Y. Kubo, et al., J. Chem. Soc., Chem. Commun., 305 (1993), the teachings all of which are incorporated herein in their entirety.

In still another embodiment of the invention, the side chain components of the polydiacetylenes of the invention include planar aromatic chromophores. Examples of suitable planar aromatic chromophore substituents include p-oxybenzylidinemalononitrile, N-alkyl-N-[p-dicyanovinylphenyl]amino, 4-tricyanovinyl xylenol, 3-tricyanovinyl indole, 3-tricyanovinylcarbazole, 4-tricyanovinyl-phenyl hydrazone, N-alkyl-N-[p-tricyanovinylphenyl] amino, etc.

The invention will now be set forth and further explained in the following examples. All parts and percentages are by weight unless otherwise stated.

Exemplification

Synthesis of p-Tricyanovinyl-N-Methyl-N-Propargylaniline

The procedure is an adaptation of that of McKusick and Melby (B. C. McKusick and L. R. Melby, in *Organic Syntheses*, N. Rabjohn, ed. (NY: Wiley) Collective Vol. IV, p. 953, the teachings of which are incorporated herein in their entirety). To a solution of (7.84 g, 0.054 mole) of N-methyl-N-propargylaniline in 16 mL dimethylformamide (DMF) was added slowly over 10 minutes. Tetracyanoethylene (TCNE) (6.03 g, 0.046 mole), maintaining a temperature of 45–50° C. in a water bath. The reaction was held at this temperature for another 15 min. The purple syrup was taken up in 80–90 ml of ether, washed twice with water and the ether-evaporated. The resulting semisolid purple mass was worked with 5 ml iced methanol and 10 ml of iced ether and suction-filtered to yield 9.030 grams of crude product. Recrystallization from 40 ml of hot acetic acid yielded 4.19 g (37%) of red-violet crystals, mp 159.4–160.1° C.: IR (KBR) 3326, 2217, 1605, 1495, 1397, 1342, 1224, 1195, 825, 760, 666, 620 cm$^{-1}$; $^1$H NMR ((CD$_3$)$_2$SO) δ2.33 (t, J=2.1), 3.23 (s, 3), 4.23 (d, J=2.2), 6.88 (d, J=10.2), 8.14 (d, J=10.2), $^{13}$C NMR ((CD$_3$)$_2$SO) δ39.1 (N—CH$_3$), 42.1 (N—CH$_2$—), 76.2 (yneC-H), 79.4 (-Cyne), 79.9 (=C(CN)$_2$), 114.3 (arom), 114.9 (CN), 115 (CN), 115.6 (CN), 118.4 (arom), 133.1 (arom), 138.2 (=C(CN)Ph), 154.9 (arom); Visible spectrum:(acetone) $\lambda_{max}$494 nm(ε=34,000).

Synthesis of 1,6-Bis(N-Methyl-N-[p-Tricyanovinylphenyl]Amino)-2,4-Hexadiyne

The procedure follows that of McKusick and Melby (B. C. McKusick and L. R. Melby, in *Organic Syntheses*, N. Rabjohn, ed. (NY: Wiley) Collective Vol. IV, p. 953). To a stirred solution of 1,6-bis(N-methyl-N-phenylamino)-2,4-hexadiyne (G. Schleier, Ph.D. Thesis, Universitat Freiburg (1980), the teachings of which are incorporated herein in their entirety) (0.615 g, 2.33 mM) in 3 ml DMF at 40° C. was added over 5 min., TCNE (0.664, 5.18 mM) and the mixture stirred under static argon for two hours at 45–50° C. After cooling to 0° C., suction filtration and washing with iced methanol and ether yielded 0.137 g of red material. The filtrate, after removal of the ether and methanol under reduced pressure and dilution with 3 ml DMF, was stirred in a 50 ml flask at 45–50° C. under a stream of nitrogen for another few hours until it became almost solid. It was then heated briefly to 100° C. to dissolve precipitated matter, cooled to 0° C., suction filtered, washed with iced methanol and ether and vacuum dried to yield 0.505 g (56% yield total) of fine red crystals, which did not melt but began to turn a very dark purple above 130° C., dec. 211–345° C. with loss of 31.5% of mass by thermogravimetric analysis. FT-Raman (1064 nm excitation) 1395.0, 1441.7, 1463.3, 1489.4, 2216.6 cm$^{-1}$; IR (KBR) 2218, 1604, 1494, 1393, 1342, 1220, 1191, 1113, 990, 923, 824, 758, 666 cm$^{-1}$; $^1$H NMR ((CD$_3$)$_2$SO) δ2.97 (s,6), 4.57 (s,4), 7.05 (d,J=12.4), 7.94 (d,J=12.4); $^{13}$C NMR ((CD$_3$)$_2$SO) δ39.3 (N—CH$_3$), 42.7 (N—CH$_2$—), 68.5 (yneC-), 75.6 (ynec—Cyne), 80.7 (=C(CN)$_2$), 114.4 (arom), 114.7 (CN), 114.9 (CN), 115.6 (CN), 118.6 (arom), 133.1 (arom), 138.5 (=C(CN)Ph), 154.7 (arom); visible spectrum ((CH$_3$)$_2$CO): $\lambda_{max}$490 nm (ε=43,000); Powder X-ray diffraction d-spacings (Å) (recrystallized from CH$_3$CN): 14.01 (s), 10.33(s), 8.60(s), 8.10(s), 7.03(s), 6.00, 5.64, 5.15, 4.92, 4.76, 4.66, 4.41, 4.22, 4.14, 4.22, 4.14, 4.02, 3.91, 3.81, 3.71, 3.52(s), 3.36(s), 3.36(s), 3.28, 3.21, 3.14, 2.99, 2.83. Anal. Calcd, for C$_{30}$H$_{18}$N$_8$: C, 73.46; H, 3.67; N 22.84. Found: C, 73.08; H, 3.76; N, 22.75.

An alternate procedure used symmetric acetylene coupling. A mixture of CuCl (0.0853 g, 0.862 mM), TMEDA (0.1006 g, 0.867 mM) and 4 ml DMF were mixed in a 20 ml flask until the mixture turned an intense dark blue. To this mixture at 0° C., tricyanovinyl-N-methyl-N-propargylaniline (0.9990 g, 4.060 mM) in 6 to 7 ml of DMF was added dropwise over 20 min. and the reaction continued for 40 hrs. at the same temperature. The mixture was suction-filtered and the red solid material washed with 0.5N HCl, water and a little acetone to yield 0.5034 g (51%).

Figure 7:
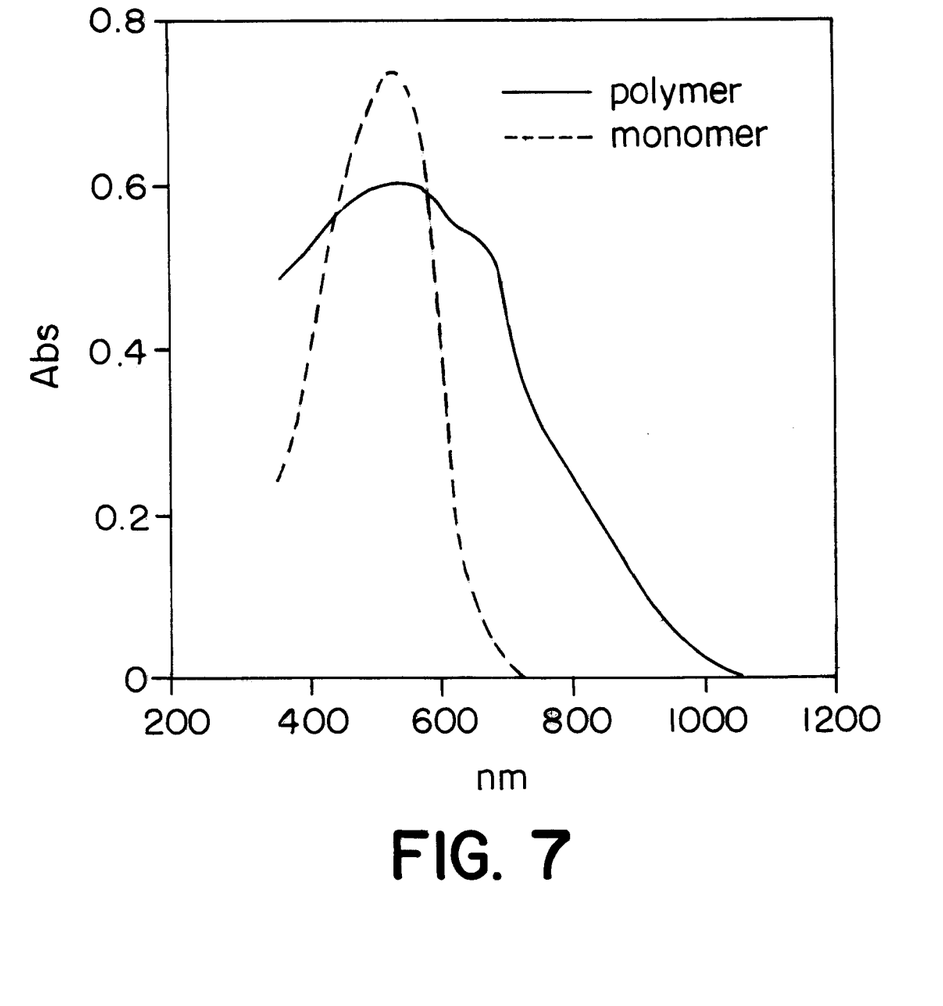
FIG. 7 includes plots of diffuse reflectance of 1,6-bis(N-methyl-N-[p-tricyanovinylphenyl]amino)-2,4-hexadiyne and its polymer dispersed in NaCl in 1% concentrations.

Polymerization of 1,6-Bis(N-Methyl-N-[p-Tricyanovinylphenyl]Amino)-2,4-Hexadiyne The monomer was recrystallized from CH$_3$CN and became uniformly black after being heated for 230 hr. at 130° C. in a vacuum oven. FT-Raman (1064 nm excitation (1218.0, 1330.4, 1445.0, 1486.7, 1545.0, 2076.0 cm$^{31\ 1}$; IR (KBr) 2215, 1605, 1494, 1397, 1343, 1220, 1191, 1113, 824 cm$^{-1}$; Powder X-Ray d-spacings (Å): 12.96, 11.57(s), 10.76 (s), 9.48(s) 6.88, 6.48, 5.87, 5.36, 4.72, 4.40, 4.03, 3.86, 3.70, 3.57, 3.44, 3.22, 3.04, 2.90, 2.77, 2.62, 2.60, 2.42, 2.37, 2.28, 2.18, 1.81. A plot of the diffuse reflectance of the monomer and polymer dispersed in NaCl in 1% concentrations is shown in FIG. 7. A polymer was also made by heating the monomer without first recrystallizing. FT-Raman (1064 nm excitation) 145, 1487, 2098 plus broad bands 500–1220 and 1420–3200 (cm$^{-1}$. The IR spectrum (KBR) was the same.

Synthesis of 1,6-Bis(p-Oxybenzaldehyde)-2,4-Hexadiyne

To a solution of KOH (1.68 g, 0.030 mole) and p-hydroxybenzaldehyde (3.51, 0.029 mole) in 46 ml methanol was added 1,6-Bis(p-toluenesulfonate)-2,4-hexadiyne (5.51 g, 0.013 mole) and the mixture refluxed for 14.5 hours before being cooled to room temperature. Suction filtration left a brown mass which was washed with 14 mL of water and a little methanol to yield 2.90 g of a dark tan material. Crystallization from hot toluene yielded 1.20 g of brown crystals, mp 164–172° C. Further concentrations of the mother liquor yielded three fractions of slightly lower mp, bringing the total to 1.94 g (46%): IR (KBr) 3076, 2927, 2837, 2737, 1691, 1602, 1577, 1508, 1426, 1370, 1304, 1247, 1161, 1020, 838, 653, 666, 623, 512 cm$^{-1}$; $^1$H NMR (CDCl$_3$) δ4.87 (s, 4H), 7.07 (d, J=8.4H), 7.87 (d, J=8.4H), 9.94 (s, 2H); 13c NMR (CDCl$_3$) δ56.7 (0.CH$_2$—), 71.9 (-Cyne), 74.4 (yneC—Cyne), 115.6 (arom), 131.3 (arom), 132.3 (arom), 162.5 (arom), 190.9 (O=C—).

Synthesis of 1,6-Bis(p-Oxybenzylidinemalononitrile)-2,4-Hexadiyne

A mixture of 1,6-bis(p-oxybenzaldehyde)-2,4-hexadiyne (3.80 g, 0.0119 mole), malononitrile (3.08 g, 0.0467 mole) and morpholine (40 drops) in methanol (175 ml) and toluene (175 ml) were refluxed for eight hours and allowed to cool to room temperature. Suction filtration yielded 2.80 g of dark green crystals. Concentration of the filtrate to one half volume yielded 0.1498 g of yellow-green flakes. Addition of water to the filtrate precipitated 0.211 g of a yellow green solid which was easily separated and filtration of the water layer overnight yielded another 1.01 grams of similar material. All recovered material was dissolved in 200 mL of boiling acetic acid, filtered and kept in the dark. On cooling, yellow crystals had formed on the sides of the flasks (1.02 g), which turned green on filtration and washing with water and methanol. Addition of water to the mother liquor produced another 3.21 g of fine yellow crystals, also turning green upon filtration and washing, to yield a total of 4.23 g (86%). This solid does not melt but slowly turns brick red between 102 and 138° C.: IR (KBr) 3027, 2230, 2223, 1602, 1588, 1562, 1510, 1430, 1397, 1317, 1269, 1230, 1018, 831, 613, 531 cm$^{-1}$; $^1$H NMR ((CD$_3$)$_2$NCDO) δ5.14 (5.4), 7.27 (d, J=10.4), 8.10 (d, J=10.4), 8.21 (s, 2); $^{13}$C NMR ((CD$_3$)$_2$NCDO) a 57.0 (O—CH$_2$—), 70.9 (yne—CH$_2$—), 75.8 (ynec—Cyne), 78.9 (=C(CN)$_2$), 114.3 (CN), 115.2 (CN), 116.4 (arom), 125.9 (arom), 133.8 (arom), 160.7 (=C(H)Ph), 162.0 (arom).

Anal. Calcd. for C$_{26}$H$_{14}$N$_4$O$_2$: C, 75.35; H, 3.41; N 13.52; 0, 7.72 Found: C, 73.94; H, 3.11; N, 13.22.

Formation of 1,6-Bis(p-Oxybenzylidinemalononitrile)-2,4-Hexadiyne Polymer

The monomer became uniformly black after being heated 230 hr. at 130° C. in a vacuum oven. Powder X-ray diffraction d-spacings (Å): 16.37, 13.84, 7.68, 7.01, 6.45, 5.62, 5.51, 4.63, 4.27, 4.05, 3.90, 3.76, 3.67, 3.29, 3.14. FT (Raman (1064 nm excitation): 2081, 1464, 1441, 1360, 1236 (cm$^{-1}$)

Synthesis of 1,6-Bis(N-Ethyl-N-[P-Tricyanovinylphenyl]Amino)-2,4-Hexadiyne Polymer N-Ethyl-N-Propargylaniline The procedure follows that of (Reppe and Mitarbeiter, *Annalen der Chemie*, 596:38–75 (1955)). Ethylaniline (37.1 g, 0.300 Moles) and Benzenesunfonylchloride (60.7 g, 0.300 Moles); are combined in a 500 mL Erlenmeyer flask. To this is added 125 mL of 13% Sodium Carbonate and 100 mL of water and the mixture stirred for 40 hours. The mixture was extracted with ether, dried and 97 mL Acetic anhydride added, the ether evaporated, thinned with benzene and finally extracted with 3:1 Hydrochloric acid. The acidic solution was back extracted with about 30 mL of benzene before being neutralized with Sodium Carbonate, let settle overnight and finally steam distilled. The distillate was extracted with ether and the ether evaporated to 26.8 g (56% yield) of pale yellow liquid IR (neat) 3291, 3062, 3027, 2972, 2931, 2113, 1600, 1505, 1457, 1377, 1348, 1275, 1244, 1185, 1127, 1039, 1009, 750, 692, 651 cm$^{-1}$; $^1$H NMR (CDCl$_3$) δ1.27 (t, J=7.3) 2.23 (t, J=2.5, 1), 3.49 (q, J=7.2), 4.06 (d, J=2.5), 6.89 (m, 3), 7.29 (m, 2); $^{13}$C NMR (CDCl$_3$)$^2$ δ12.9 (—CH$_3$), 40.1 (N—CH$_2$—), 46.0 (N—CH$_2$—), 72.1 (yneC-), 80.8 (yneC), 114.4 (arom), 118.2 (arom), 129.6 (arom), 148.3 (arom).

1,6 Bis(N-Ethyl-N-Phenylamino)-2,4-Hexadiyne

The procedure follows that of Schlier (Ph.D. Thesis, Universitat Freiburg (1980)). To a stirred mixture of CuCl (4.90 g, 0.0495 Moles) in 300 mL Dimethylformamide (DMF) at room temperature in a bubbler was added N,N,N,N-Tetramethylenediamine (5.54 g, 0.0478 Moles). To this mixture was added via dropping funnel over 45 minutes N-ethyl-N-propargylaniline (9.24 g, 0.0581 Moles) in 150 mL DMF. Oxygen was then allowed to bubble through the mixture while stirring. After 21 hours 100 mL of water to which 5 mL of concentrated Hydrochloric acid had been added was added to the reaction mixture dropwise. Then 500 mL of water was added in the same way. This mixture was filtered by suction and washed with a little Hydrochloric acid of the same dilution as previously and dried in a vacuum dissector to yield 5.67 g of light plates (62% yield). Separation on a silica column eluted with a 4:1 Hexane/Ethyl acetate mixture and evaporating to a small volume yielded a product of higher purity, M.P. 109.3–111.4; IR (KBR) 3064, 3029, 2975, 2878, 1599, 1505, 1427, 1385, 1327, 1248, 1185, 749, 693 cm$^{-1}$; $^1$H NMR (CDCl$_3$) δ1.25 (t, J=7.6), 3.46 (q, J=7.4), 4.11(s, 4), 7.05 (m, 4), 7.31 (d, 4); $^{13}$C NMR (CDCl$_3$) δ13.0 (—CH$_3$), 40.1 (N—CH$_2$—), 46.0 (N—CH$_2$—), 68.5 (yneC-), 75.4 (yneC—Cyne), 114.3 (arom), 118.3 (arom), 129.7 (arom), 148.2 (arom).

1,6-Bis(N-Ethyl-N-[P-Tricyanovinylphenyl]Amino)-2,4-Hexadiyne

The procedure follows that of McKusick and Melby (McKusick, B. C.; Melby, L. R. In *Organic Synthesis*; Rabjohn, N., Editor in Chief; Wiley, New York, Collective Volume IV, p. 953). To a stirred solution of 1,6-Bis(N-ethyl-N-phenylamino)-2,4-hexadiyne (1.008 g, 3.50 mM) in 5 mL DMF at 40° C. was added over 1–3 min., TCNE (0.967, 7.55 mM) and the mixture stirred for five hours at 40–51° C. under reduced pressure (aspirator). Cooling to 0° C. overnight, suction filtration and washing with methanol and ether and drying under vacuum yielded 0.5018 g of red material (0.969 M, 31.5% yield), which did not melt but began to turn a very dark purple above 155° C., decomposing at about 260° C. with loss of 32% by thermogravimetric analysis. FT-Raman (1063 nm excitation) 1452.0, 1441.7, 1482, 1536, 2216 cm$^{-1}$; IR (KBR) 3118, 2966, 2219, 1605, 1500, 1456, 1412, 1340, 1224, 1197, 1121, 1007, 833, 800, 749 cm$^{-1}$; $^1$H NMR (CD$_3$)$_2$SO) δ1.18 (t, J=7.6), 3.63 (q, J=7.4), 4.54 (s, 4), 7.05 (d, J=9.4), 7.95 (d, J=9.4); $^{13}$C NMR ((CD$_3$)$_2$SO) δ13.2 (—CH$_3$) 40.1 (N—CH$_2$—), 47.0 (N—CH$_2$—), 68.3 (yneC-), 76.2 (yneC—Cyne), 79.8 (=C(CN)$_2$), 114.2 (arom), 114.8 (CN), 115.0 (CN), 115.6 (CN), 118.2 (arom), 133.3 (arom), 138.2 (=C(CN)Ph), 153.7 (arom); Visible spectrum ((CH$_3$)$_2$CO) 499 (0.7×10$^6$).

1,6 Bis(N-Ethyl-N-[P-Tricyanovinylphenyl]Amino)-2,4-Hexadiyne Polymer

The monomer was recrystallized from 80% Toluene 20% Methylethylketone and became uniformly black after being heated 230 hr. at 130° C. in a sealed ampoule. FT-Raman (1064 nm excitation) 1222, 1444, 1490, 1519, 1537, 2074, 2122 (cm$^{-1}$).

Equivalents

Those skilled in the art will recognize, or be able to ascertain using no more than routine experimentation, many equivalents to the specific embodiments of the invention described specifically herein. Such equivalents are intended to be encompassed in the scope of the claims.

What is claimed is:

1. A substituted polydiacetylene having a side chain substituent wherein the side chain substituent is a planar cyanovinyl aromatic substituent.

2. The substituted polydiacetylene of claim 1 wherein said substituted polydiacetylene exhibits an absorption maximum in the range of visible light at wavelengths longer than about 620 nm.

3. The substituted polydiacetylene of claim 1 wherein the planar cyanovinyl aromatic substituent has two cyano groups.

4. The substituted polydiacetylene of claim 1 wherein the planar cyanovinyl aromatic substituent has three cyano groups.

5. The substituted polydiacetylene of claim 1 wherein a model compound for the planar cyanovinyl aromatic substituent exhibits a dipole moment of between about 4 and about 12 Debye.

6. The substituted polydiacetylene of claim 5 where the planar cyanovinyl aromatic substituent is a N-alkyl-N-(p-tricyanovinylphenyl)amino group.

7. The substituted polydiacetylene of claim 1 where the planar cyanovinyl aromatic substituent contains an amino group.

8. The substituted polydiacetylene of claim 1 where the planar cyanovinyl aromatic substituent contains an ether group.

9. The substituted polydiacetylene of claim 1 where the planar cyanovinyl aromatic substituent contains a phenylhydrazone.

10. A substituted polydiacetylene formed from 1,6-bis(N-alkyl-N-(p-tricyanovinylphenyl)amino)-2,4-hexadiyne.

11. A substituted polydiacetylene formed from 1,6-bis(p-oxybenzylidinemalononitrile)-2,4-hexadiyne.

12. The substituted polydiacetylene of claim 3 wherein the planar cyanovinyl aromatic substituent is a p-oxobenzilidine malononitrile.

13. The substituted polydiacetylene of claim 3 wherein the planar cyanovinyl aromatic substituent is a N-alkyl-N-(p-dicyanovinylphenyl)amino group.

14. The substituted polydiacetylene of claim 4 wherein the planar cyanovinyl aromatic substituent is a N-alkyl-N-(p-tricyanovinylphenyl)amino group.

15. The substituted polydiacetylene of claim 4 wherein the planar cyanovinyl aromatic substituent is a 4-tricyanovinyl xylenol.

16. The substituted polydiacetylene of claim 4 wherein the planar cyanovinyl aromatic substituent is a 4-tricyanovinyl-phenylhydrazone.

17. A substituted 2,4-hexadiyne that has at least one side chain substituent, wherein the side chain substituent is a planar cyanovinyl aromatic substituent.

18. The substituted 2,4 hexadiyne of claim 17, wherein a substituted polydiacetylene formed from said substituted 2,4 hexadiyne exhibits an absorption maximum in the range of visible light at wavelengths longer than about 620 nm.

19. The substituted 2,4 hexadiyne of claim 17 wherein the planar cyanovinyl aromatic substituent includes two cyano groups.

20. The substituted 2,4 hexadiyne of claim 17 wherein the planar cyanovinyl aromatic substituent includes three cyano groups.

21. The substituted 2,4 hexadiyne of claim 17 wherein a model compound for the planar cyanovinyl aromatic substituent exhibits a dipole moment of between about 4 and about 12 Debye.

22. The substituted 2,4 hexadiyne of claim 20, where the planar cyanovinyl aromatic substituent is a N-alkyl-N-(p-tricyanovinylphenyl amino group.

23. The substituted 2,4 hexadiyne of claim 17 where the planar cyanovinyl aromatic substituent is an amino group.

24. The substituted 2,4 hexadiyne of claim 17 where the planar cyanovinyl aromatic substituent is an ether group.

25. The substituted 2,4 hexadiyne of claim 17 where the planar cyanovinyl aromatic substituent is a phenylhydrazone.

26. The substituted 2,4 hexadiyne of claim 19, wherein the planar cyanovinyl aromatic substituent is a p-oxobenzilidine malononitrile.

27. The substituted 2,4 hexadiyne of claim 19 wherein the planar cyanovinyl aromatic substituent is a N-alkyl-N-(p-dicyanovinylphenyl)amino group.

28. The substituted 2,4 hexadiyne of claim 19 wherein the planar cyanovinyl aromatic substituent is a N-alkyl-N-(p-tricyanovinylphenyl)amino group.

29. The substituted 2,4 hexadiyne of claim 20 wherein the planar cyanovinyl aromatic substituent is a 4-tricyanovinyl xylenol.

30. The substituted 2,4 hexadiyne of claim 20 wherein the planar cyanovinyl aromatic substituent is a 4-tricyanovinyl-phenylhydrazone.

\* \* \* \* \*

UNITED STATES PATENT AND TRADEMARK OFFICE
CERTIFICATE OF CORRECTION

PATENT NO. : 6,005,058
DATED : December 21, 1999
INVENTOR(S) : Daniel J. Sandman and James L. Foley It is certified that error appears in the above-identified patent and that said Letters Patent is hereby corrected as shown below:

Claim 6, line 1, delete "Claim 5" and insert --Claim 4--.

Signed and Sealed this

Nineteenth Day of September, 2000

Attest:

Q. TODD DICKINSON

*Attesting Officer*    *Director of Patents and Trademarks*